(12) United States Patent
Nagakubo et al.

(10) Patent No.: US 6,313,891 B1
(45) Date of Patent: Nov. 6, 2001

(54) LIQUID CRYSTAL DISPLAY DEVICE WITH LIGHT QUANTITY CONTROL PORTION

(75) Inventors: Hideaki Nagakubo; Mitsuaki Yamazaki; Satoshi Matsubara; Ryohei Kakuta, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 08/985,997

(22) Filed: Dec. 5, 1997

(30) Foreign Application Priority Data

Dec. 6, 1996 (JP) .................................................. 8-342734
Dec. 6, 1996 (JP) .................................................. 8-342735
Dec. 6, 1996 (JP) .................................................. 8-342736

(51) Int. Cl.[7] .................................................. G02F 1/1335
(52) U.S. Cl. .................................................. 349/65; 362/31
(58) Field of Search .................................................. 349/64, 65, 62; 362/26, 31

(56) References Cited

U.S. PATENT DOCUMENTS

| | | | |
|---|---|---|---|
| 4,118,111 | * | 10/1978 | Laesser .................................. 350/334 |
| 4,673,253 | * | 6/1987 | Kato ....................................... 349/65 |
| 4,673,254 | * | 6/1987 | Kato et al. ............................. 350/345 |
| 4,714,983 | * | 12/1987 | Lang ....................................... 362/27 |
| 4,998,804 | * | 3/1991 | Horiuchi ................................. 349/62 |
| 5,046,826 | * | 9/1991 | Iwamoto et al. ........................ 349/65 |
| 5,253,089 | * | 10/1993 | Imai ....................................... 349/70 |
| 5,280,372 | * | 1/1994 | Horiuchi ............................... 345/102 |
| 5,345,325 | * | 9/1994 | Twachtman ............................ 359/69 |
| 5,371,618 | * | 12/1994 | Tai et al. ................................ 359/53 |
| 5,394,308 | * | 2/1995 | Watanabe et al. ...................... 362/31 |
| 5,617,251 | | 4/1997 | Ohta et al. ............................ 359/599 |
| 5,751,386 | * | 5/1998 | Kanda et al. ........................... 349/65 |
| 5,831,697 | * | 11/1998 | Evanicky et al. ...................... 349/62 |
| 5,852,483 | * | 12/1998 | Newstead et al. ..................... 349/62 |
| 5,886,759 | * | 3/1999 | Mashino et al. ....................... 349/65 |
| 5,949,505 | * | 9/1999 | Funamoto et al. ..................... 349/31 |

FOREIGN PATENT DOCUMENTS

| | | | |
|---|---|---|---|
| 2-253234 | * | 2/1990 | (JP) . |
| 3-137618 | * | 3/1991 | (JP) . |
| 3-203771 | * | 3/1991 | (JP) . |
| 3-68923 | * | 3/1991 | (JP) . |
| 8-122537 | * | 8/1996 | (JP) . |

* cited by examiner

*Primary Examiner*—Kenneth Parker
(74) *Attorney, Agent, or Firm*—Brinks Hofer Gilson & Lione

(57) ABSTRACT

In a liquid crystal display device, a light quantity control portion b 4a is formed to a dot shape by print or the like on a diffusion plate 4 interposed between lens sheets 3 and a light transmission member 5 on the side thereof near to a backlight source 8 composed of a cold cathode fluorescent lamp or the like. Since the dots of the light quantity control portion 4a have a light transmitting property to a certain extent, they reflect a part of the light from the backlight source 8 and permit the remaining light to pass therethrough. With this arrangement, there can be provided the liquid crystal display device capable of brightly and uniformly irradiating the entire surface of the effective display area of a liquid crystal panel from the backside thereof without emission lines.

16 Claims, 7 Drawing Sheets

LIQUID CRYSTAL DISPLAY DEVICE WITH LIGHT QUANTITY CONTROL PORTION

BACKGROUND OF THE INVENTION

1. Field of the Invention

The present invention relates to a liquid crystal display device for guiding light from a backlight source to a light transmission member and irradiating a liquid crystal panel, and more specifically, to the improvement of the brightness of the liquid crystal panel.

2. Description of the Related Art

Figure 11:
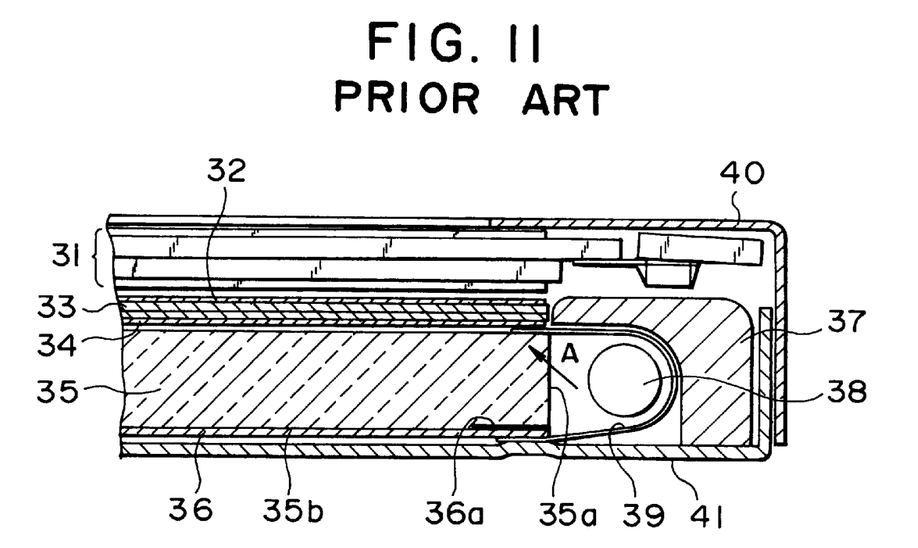
FIG. 11 is a sectional view of the main portion of a conventional liquid crystal display device.

As shown in FIG. 11, a conventional ordinary liquid crystal display device is arranged such that: successively laminated on the back surface of a liquid crystal panel 31 are a protection/diffusion sheet 32; two lens sheets 33 disposed under the protection/diffusion sheet 32 for improving the brightness of light; a diffusion plate 34 disposed under the lens sheets 33 for diffusing the light; a light transmission member 35 composed of an acryl resin or the like and disposed below diffusion plate 34, a light transmission member reflection pattern 35b formed on the bottom surface of the light transmission member 35 by silk print or when the light transmission member is molded for reflecting the light upward; and a reflection sheet 36 disposed under the light transmission member 35 for reflecting the light upward. Further, a backlight source 38 composed of a cold cathode fluorescent lamp (CCFL) or the like is disposed in a lamp holder 37 on the one end surface 35a of the light transmission member 35 and a U-shaped reflection film 39 is held in the lamp holder 37 on the upper, lower and back sides of the backlight source 38 to reflect the light from the backlight source 38 forward.

The above respective components are held by an upper holder 40 and a lower holder 41 as a frame member.

The light from the backlight source 38 and the light reflected at the reflection film 39 are irradiated to the one end surface 35a of the light transmission member 35 positioned forward of the backlight source 38 and the light from the end surface 35a is entered into the light transmission member 35. Then, the incoming light can reach every point in the light transmission member 35 while irregularly reflecting therein.

The incoming light which irregularly reflects in the light transmission member 35 is reflected at the light transmission member reflection pattern 35b on the bottom surface of the light transmission member 35, the reflection sheet 36 under the light transmission member 35 and so on in an approximately vertical direction and emerges from the upper surface of the light transmission member 35.

At the time, the light from the backlight source 38 also emerges from the upper surface of the of the portion of the light transmission member 35 which is located on the other end surface (not shown) side thereof which is apart from the backlight source 38.

The light emerged from the upper surface of the light transmission member 35 is caused to pass through the diffusion plate 34, the lens sheets 33, the protection/diffusion sheet 32 on the lens sheets 33 and so on so that it can irradiate the effective display area 31a of the liquid crystal panel 31 from the backside thereof.

In the liquid crystal display device described above, however, the light which irradiates the liquid crystal panel 31 includes two kinds of light beams. One of the light beams, that is, a first light beam is such that when the light which emerges from the backlight source 38 and the reflection film 39 and travels straight in an approximately horizontal direction enters the light transmission member 35, the light irregularly reflects in the light transmission member 35 and the thus irregularly reflected light is reflected at the light transmission member reflection pattern 35b on the bottom surface of the light transmission member 35, the reflection sheet 36 under the light transmission member 35 and so on while changing its direction approximately perpendicularly to the light transmission member 35, then emerges upward from the upper surface of the light transmission member 35 and irradiates the entire surface of the effective display area 31a of the liquid crystal panel 31 from the backside thereof.

Figure 12:
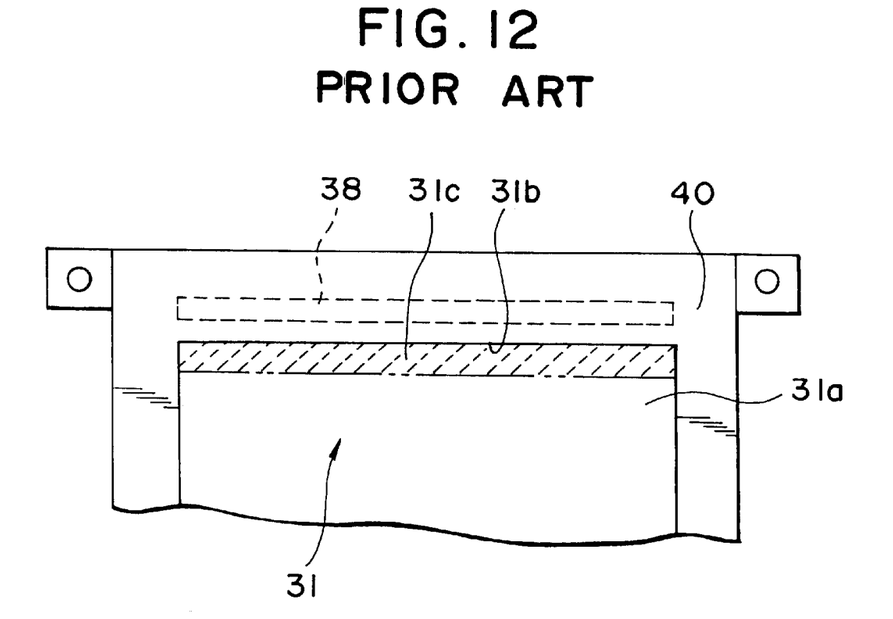
FIG. 12 is a schematic plan view describing a state of emission lines of the conventional liquid crystal display device.

Whereas, the other of the light beams, that is, a second light beam is such that when an oblique light beam A shown by the arrow in FIG. 11 emerges from the backlight source 38 and the reflection film 39 obliquely upward with respect to the end surface 35a of the light transmission member 35 and enters the light transmission member 35, the oblique light beam A passes through the light transmission member 35 straight in an obliquely upward direction without irregularly reflecting in it, emerges from the light transmission member 35 and irradiates, in addition to the first light beam, the portion of the effective display area 31a which is shown in the schematic plan view of the liquid crystal display device in FIG. 12 and located near to the edge 31b thereof in the vicinity of the backlight source 38, for example, the portion of the effective display area 31a within the range of 10 mm from the edge 31b of the liquid crystal panel 31.

Since the portion of the effective display area 31a within the range of 10 mm from the edge 31b of the liquid crystal panel 31 is irradiated by the composite light beam composed of both the first and second light beams, the above portion of the effective display area 31a is brighter than the other portion thereof and "glittering state" emission lines 31c are generated. Accordingly, there is a problem that the brightness of the effective display area 31a of the liquid crystal panel 31 is made uneven.

As a coutermeasure to cope with the above problem, the conventional liquid crystal display device has a black or gray colored portion 36a formed thereto by print or the like within the range of approximately 10 mm, which is near to the backlight source 38, of the reflecting surface of the reflection sheet 36 under the light transmission member 35 to absorb a part of the first light beam so that the generation of the emission lines 1c is prevented by lowering the brightness of the effective display area 31a within the range of approximately 10 mm thereof near to the edge 31b.

In the conventional liquid crystal display device, however, since the "glittering state" emission lines 31c which are generated to the effective display area 31a of the liquid crystal panel 31 are prevented by the provision of the black or gray colored portion 36a formed within the range of approximately 10 mm near to the backlight source 38 of the reflection sheet 36, there is a problem that the surface brightness in the liquid crystal display area is lowered, although there is an effect that the light of the backlight source 38 is partly absorbed by the colored portion 36a and the quantity of light emerged upward from the light transmission member 35 is reduced and the generation of the emission lines is prevented.

Figure 13:
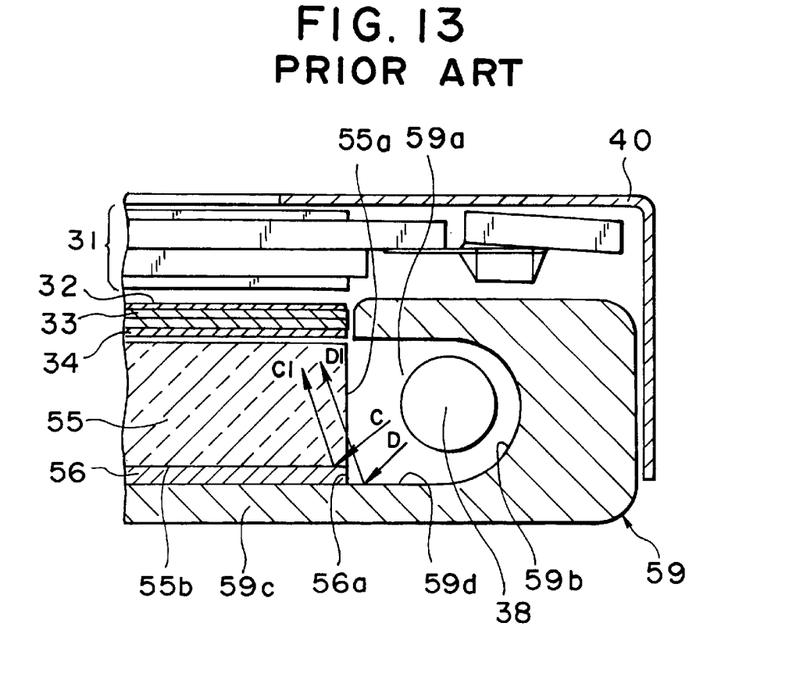
FIG. 13 is an enlarged sectional view of the main portion of another conventional liquid crystal display device.
Figure 14:
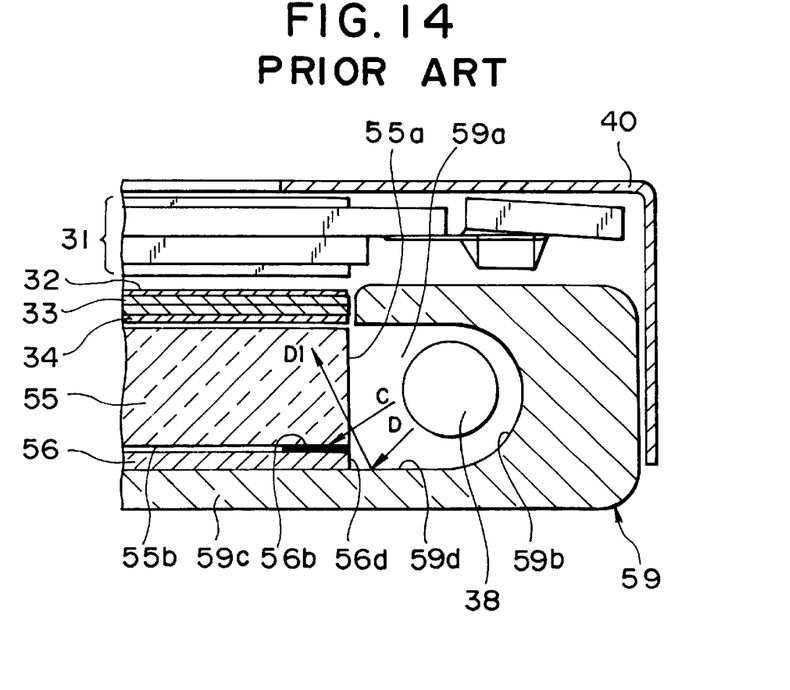
FIG. 14 is an enlarged sectional view of the main portion of the another conventional liquid crystal display device.

As shown in FIGS. 13 and 14, another conventional liquid crystal display device has a reflector 59 whose interior is formed to a U-shape so as to encase a backlight source 38.

A reflecting surface 59b to which glossy processing is applied is formed to the interior of the opening 59a of the reflector 59 so that the reflecting surface 59b reflects the light irradiated from the backlight source 38 forward and irradiates the end surface 55a of a light transmission member 55.

Further, a case portion 59c on which the aforesaid respective components are placed is formed to the reflector 59 integrally therewith. The respective members are held by the reflector 59 having the case portion 59c and an upper holder 40 acting as a frame member.

According to the liquid crystal display device arranged as described above, in the liquid crystal panel 31 shown in FIG. 12 which shows the schematic plan view of the liquid crystal display device, there is a second light beam, that is, a reflected light beam C1 which irradiates, in addition to the above first light beam, the portion of the effective display area 31a of the liquid crystal panel 31 which is located near to the edge portion 31b in the vicinity of the backlight source 38, for example, the portion of the effective display area 31a of the liquid crystal panel 31 within the range of 10 mm from the edge 31b.

The behavior of second light beam or the reflected light beam C1 is such that since the above portion of the effective display area 31a is located near to the backlight source 38, when an oblique light beam C shown by the arrow in FIG. 13 irradiates the surface of a reflection sheet 56 within the range of 10 mm from the end surface 56a thereof, it is reflected at the reflection sheet 56 and the thus reflected light beam C1 passes through the light transmission member 55 straight in an obliquely upward direction without irregularly reflecting therein and emerges from the upper surface of the light transmission member 55 so as to irradiate the portion of the effective display area 31a within the range of 10 mm from the edge portion 31b of the liquid crystal panel 31.

The second light beam includes, in addition to the reflected light beam C1, a reflected light beam D1 which irradiates the portion the effective display area 31a within 10 mm from the edge 31b of the liquid crystal panel 31. The behavior of the reflected light beam D1 is such that when an oblique light beam D irradiates the lower plane portion 59d of the reflecting surface 59b of the reflector 59, in which the backlight source 38 is encased, on the side thereof near to the light transmission member 55, the oblique light beam D is reflected upward at the lower plane portion 59d and when the thus reflected light beam D1 enters the light transmission member 55 from the end surface 55a, it passes through the light transmission member 55 likewise the reflected light beam C1 and emerges from the upper surface of the light transmission member 55 so as to irradiate the portion of the effective display area 31a within the range of 10 mm from the edge portion 31b of the liquid crystal panel 31.

As a result, since the portion of the effective display area 31a within the range of 10 mm from the edge 31b of the liquid crystal panel 31 is irradiated by the composite light beam composed of the first and second light beams, the portion is made brighter than the other area. Thus, there is a problem that the brightness of the effective display area 31a of the liquid crystal panel 31 is made uneven by the generation of "glittering state" emission lines 31c.

As a coutermeasure to cope with the above problem, the conventional liquid crystal display device has a light quantity control portion 56b of, for example, black or gray formed by print or the like to the reflection sheet 56 under the light transmission member 55 within the range of 10 mm from the end surface 56a thereof for partly absorbing the second light beam so that the generation of the emission lines 1c is prevented by lowering the brightness of the effective display area 31a of the liquid crystal panel 31 within the range of approximately 10 mm thereof which is located near to the edge 31b as shown in FIG. 14.

In the aforesaid conventional liquid crystal display device, since the light quantity control portion 56b composed of the colored portion of for example, black or gray is formed by print or the like to the reflection sheet 56 within the range of 10 mm from the end surface 56a thereof as shown in FIG. 14 to absorb the oblique light beams from the backlight source 38, the reflected light beam C1 resulting from the oblique light C can be absorbed. However, since the oblique light beam D irradiating the lower plane portion 59d of the reflecting surface 59b is not absorbed, it emerges as the reflected light beam D1. Thus, there is caused a problem that since the brightness of the effective display area 31a of the liquid crystal panel 31 is made uneven and the emission lines 31c are generated and accordingly it is difficult to discriminate characters etc. displayed on the effective display area 31a.

SUMMARY OF THE INVENTION

As first means for solving the above problem, a liquid crystal display device comprises a liquid crystal panel; a diffusion plate disposed on the backside of the liquid crystal panel; a light transmission member disposed below the diffusion plate; a reflection sheet disposed under the light transmission member; a light source disposed on an end surface side of the light transmission member; and a light quantity control portion formed on at least one surface of the diffusion plate on the side thereof near to the light source.

As second means for solving the above problem, the light quantity control portion is formed of a dot pattern.

As third means for solving the above problem, the size of the dots of the dot pattern is increased on the side of the dots near to the light source and gradually reduced as the dots are far from the backlight source.

As fourth means for solving the above problem, the diffusion plate has one surface to which no glaring prevention processing is applied and the other surface to which glaring prevention processing is applied and the light quantity control portion is formed to the one surface which is not subjected to the glaring prevention processing using a white color.

As fifth means for solving the above problem, a liquid crystal display device comprises a liquid crystal panel; a light transmission member disposed below the liquid crystal panel; a reflection sheet disposed under the light transmission member; a backlight source disposed on an end surface side of the light transmission member; a reflector having a reflection surface for reflecting the light from the backlight source to the end surface side of the light transmission member; and a light quantity control portion formed to the reflection sheet on the side thereof near to the backlight source and a light quantity control portion formed to the reflection surface of the reflector on the side thereof which is in contact with the reflection sheet in the fashion that the former light quantity control portion is continuous to the latter light quantity control portion.

As sixth means for solving the above problem, the light quantity control portion formed to the reflection surface of the reflector covers the range from the end surface of the light transmission member to just below the backlight source.

As seventh means for solving the above problem, a liquid crystal display device comprises a liquid crystal panel; a light transmission member disposed below the liquid crystal panel; a reflection sheet disposed under the light transmission member and having a light quantity control portion; a backlight source disposed on an end surface side of the light transmission member; a reflector having a reflection surface for reflecting the light from the backlight source to the end surface side of the light transmission member, wherein the reflection sheet is extended from the end surface of the light transmission member to the outside thereof on the side of the backlight source and the light quantity control portion is formed to the portion of the reflection sheet which is near to the end surface of the light transmission member and to the extended portion of the reflection sheet and the extended portion of the reflection sheet to which the light quantity control portion is formed is laid on the reflection surface of the reflector.

As eight means for solving the above problem, the light quantity control portion formed to the reflection surface of the reflector covers the range from the end surface of the light transmission member to just below the backlight source.

As ninth means for solving the above problem, the light quantity control portion is formed to an overall-printed pattern or a dot pattern.

As tenth means for solving the above problem, a liquid crystal display device comprises a liquid crystal panel; a light transmission member disposed below the liquid crystal panel; a reflection sheet disposed under the light transmission member; a backlight source disposed on an end surface side of the light transmission member; a reflector encasing the backlight source and having reflection walls formed to the periphery thereof and an opening continuous to the reflection walls; and light direction control walls formed to the opening of the reflector for controlling the direction of the light from the backlight source.

As eleventh means for solving the above problem, the light direction control walls are formed by projecting the upper and lower portions of the opening upward and downward.

As twelfth means for solving the above problem, the size of the opening of the light direction control walls is set to 50–95% of the thickness of the light transmission member.

As thirteenth means for solving the above problem, reflection layers composed of a material different from that of the reflection walls are formed to the insides of the light direction control walls.

DESCRIPTION OF THE PREFERRED EMBODIMENT

A liquid crystal display device according to the present invention will be described with reference to FIG. 1 to FIG. 3.

Figure 1:
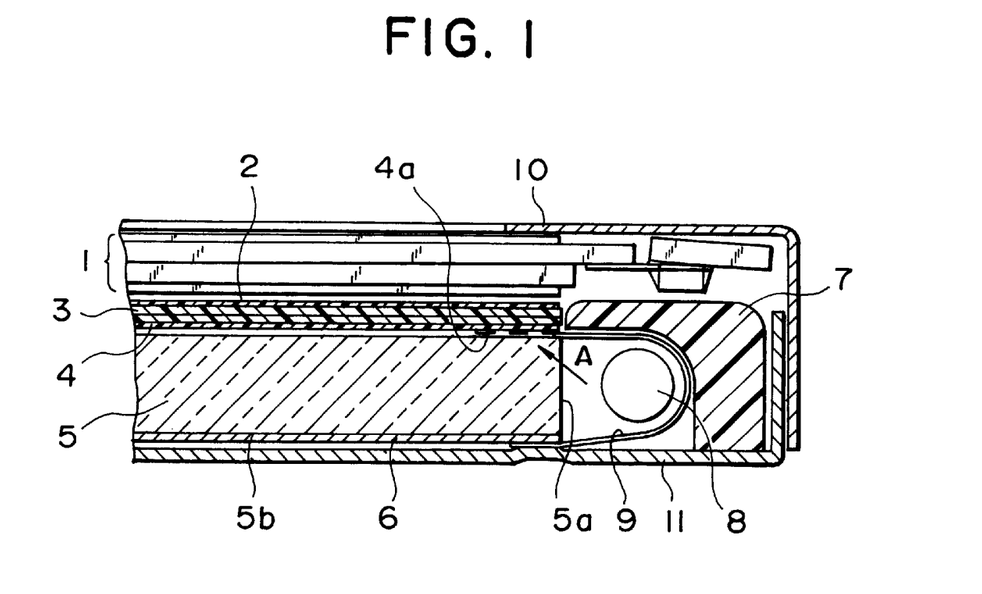
FIG. 1 is a sectional view of the main portion of a liquid crystal display device of a first embodiment according to the present invention.
Figure 2:
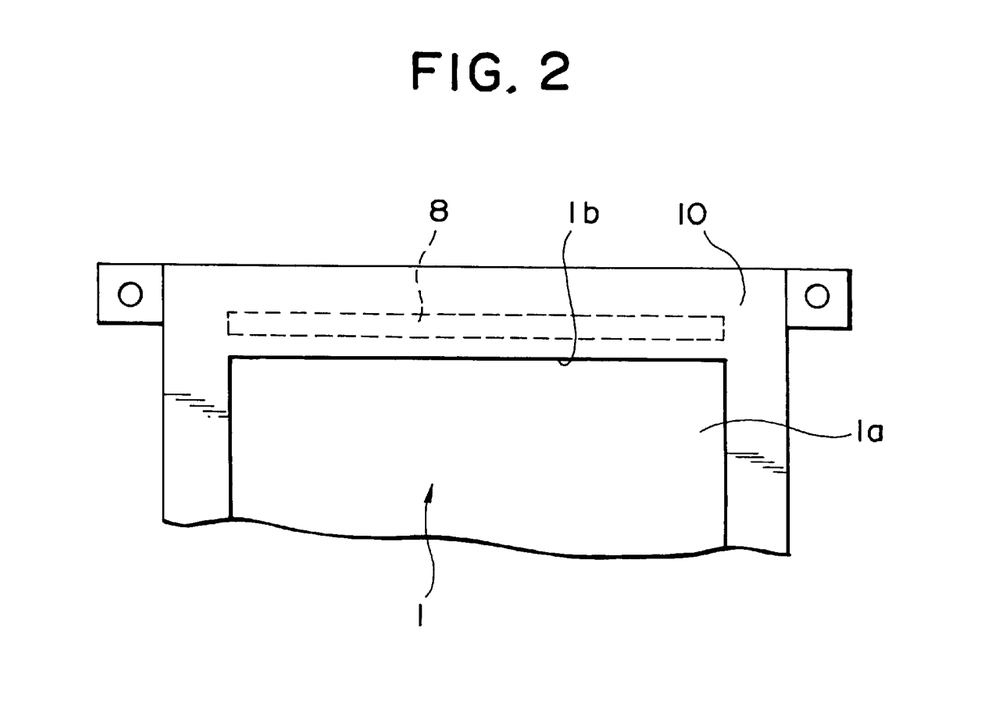
FIG. 2 is a schematic plan view showing the liquid crystal display device of the first embodiment according to the present invention.

As shown in FIG. 1, the liquid crystal display device according to the present invention is arranged such that a light transmitting protection/diffusion sheet 2 is disposed on the back surface side of a liquid crystal panel 1 so as to diffuse light and protect the surface of lens sheets 3 under the protection/diffusion sheet 2. Successively laminated under the protection/diffusion sheet 2 are: the two transparent lens sheets 3 which are laminated to each other and whose upper surface is arranged as a prism surface for improving the brightness of light; a diffusion plate 4 disposed under the two lens sheets 3 and composed of a film such as PET (polyethylene terephthalate) or the like, one surface of the film being subjected to frosted-glass-like glaring prevention processing and having fine uneven portions formed thereto and a light quantity control portion 4a being formed on the one surface at an end 4b thereof; a light transmission member 5 disposed below the diffusion plate 4 and molded of an acrylic resin or the like; a light transmission member reflection pattern 5b formed on the bottom surface of the light transmission member 5 for reflecting the light upward; and a reflection sheet 6 disposed under the light transmission member 5 for reflecting the light upward.

Further, a lamp holder 7 formed by molding or the like is disposed on the side of one end surface 5a of the light transmission member 5, a backlight source 8 composed of a cold cathode fluorescent lamp (CCFL) or the like is disposed in the lamp holder 7 and a reflection film 9 is disposed around the backlight source 8 to irradiate the light from the backlight source 8 toward the end surface 5a of the light transmission member 5 disposed in front of the backlight source 8, the reflection film 9 being composed of PET or the like curved to a U-shape with its front side opened and having a surface subjected reflection processing.

The above respective components are held by being clamped by an upper holder 10 and a lower holder 11 as a frame member.

The direct light from the backlight source 8 and the reflected light resulting from the direct light reflected at the reflection film 9 enter the light transmission member 5 from the end surface 5a thereof disposed in front of the backlight source 8. The incoming light can travel to every point in the light transmission member 5 while irregularly reflecting in the light transmission member 5. Further, the incoming light in the irregularly reflecting state is reflected upward in a vertical direction with respect to the surface direction of the light transmission member 5 at the light transmission member reflection pattern 5b on the bottom surface of the light transmission member 5 and the reflection sheet 6 under the light transmission member 5 and emerges upward from the upper surface of the light transmission member 5.

Since the reflection sheet 6 has nothing for partly absorbing the light, the reflected light reflected at the reflection sheet 6 of the present invention can cause the light having a large quantity of light and a high degree of brightness to emerge upwardly of the light transmission member 5.

The bright light emerged from the light transmission member 5 is diffused by the diffusion plate 4 and the thus diffused light is collected to the visual field angle of an effective display area 1a by the lens sheets 3, passes through the protection/diffusion sheet 2 on the lens sheets 3 and uniformly irradiates the entire region of the effective display area 1a of the liquid crystal panel 1 from the backside thereof without unevenness.

Figure 3:
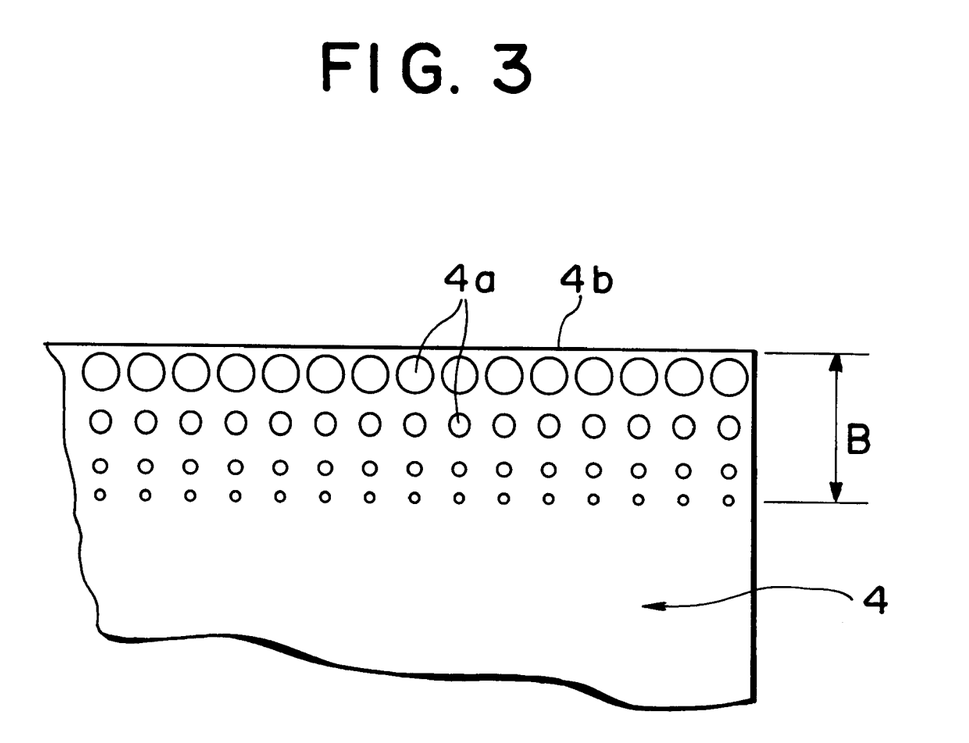
FIG. 3 is a plan view describing a dot pattern of a diffusion plate of the liquid crystal display device of the first embodiment according to the present invention.

As shown in FIG. 3, since the diffusion plate 4 has the light quantity control portion 4a formed on the one surface thereof which is not subjected to the glaring prevention on the end 4b side located near to the backlight source 8, the light quantity control portion 4a being formed by print or the like to a dot pattern which is composed of a white material having a light transmitting property to a certain extent, a part of the light from the backlight source 8 passes through the light quantity control portion 4a and emerges to the lens sheets 3 on the light quantity control portion 4a and the remaining light reflects at the light quantity control portion 4a and makes irregular reflection in the light transmission member 5.

As shown in FIG. 3, the dots of the light quantity control portion 4a located on the end 4b side near to the backlight source 8 are set to a large size, for example, to an outside diameter of about 0.5 mm and the dots farthest from the backlight source 8 are set to an outside diameter of about 0.1 mm so that the dots have a gradually reducing size as they are apart from the backlight source 8.

The light quantity control portion 4a is formed within the range of a size B from the end 4b of the diffusion plate 4, for example, within 10 mm therefrom so that it corresponds to the position where emission lines 1c generate to the effective display area 1a.

The liquid crystal display device of the present invention described above is provided with the light transmission member reflection pattern 5b formed on the bottom surface of the light transmission member 5 as well as the light quantity control portion 4a formed on the one surface of the diffusion plate 4 which is not subjected to the glaring prevention processing on the end 4b side thereof which is located near to the backlight source 8 in order to eliminate the emission lines 1c having "glaring" which is partially stronger toward the position near to the edge portion 1b of the liquid crystal panel 1 than at the portion of the effective display area 1a which is located apart from the edge portion 1b, the emission lines 1c being caused by the composite light beam composed of the first light beam which is reflected at the reflection sheet 6 in the approximately vertical direction and the second light beam which irradiates the portion of the liquid crystal panel 1 near to the edge portion 1b thereof and the second light beam being the oblique light beam A shown by the arrow in FIG. 1 which enters the light transmission member 5 from the backlight source 8 and the reflection film 9 in addition to the first light beam, passes through the light transmission member 5 straight in an oblique upward direction without making irregular reflection in the light transmission member 5 and emerges therefrom. Since a portion of the composite light beam composed of the first light beam and the second light beam passes through the light quantity control portion 4a, the light beam without "glaring" irradiates the portion of the effective display area 1a near to the edge portion 1b.

The remaining light beam which has not passed through the light quantity control portion 4a is reflected at the light quantity control portion 4a downward by making irregular reflection in the light transmission member 5 likewise the first light beam, and combined with the first light beam and emerges from the upper surface of the light transmission member 5 externally upward by being reflected at the reflection sheet 6 upward.

At the time, since the size of the dots forming the light quantity control portion 4a is increased toward the end 4b near to the backlight source 8 and gradually reduced as the light quantity control portion 4a is apart from the backlight source 8 as described above, the "glittering state" emission lines 31c at the position near to the edge portion 1b of the liquid crystal panel 1 are eliminated. As a result, the brightness of irradiation at the portion of the effective display area 1a near to the edge portion 1b of the liquid crystal panel 1 is made equal to the brightness of the portion of the effective display area 1a apart from the edge portion 1b as well as the effective display area 1a which is bright as a whole can be obtained.

Note, the present invention is not limited to the arrangement that the backlight source 8 composed of the cold cathode fluorescent lamp or the like is disposed on the one end surface side of the light transmission member 5 but is also applicable to the arrangement that the backlight sources 8 are disposed on both the end surface sides of the light transmission member 5 in confrontation with each other.

Figure 4:
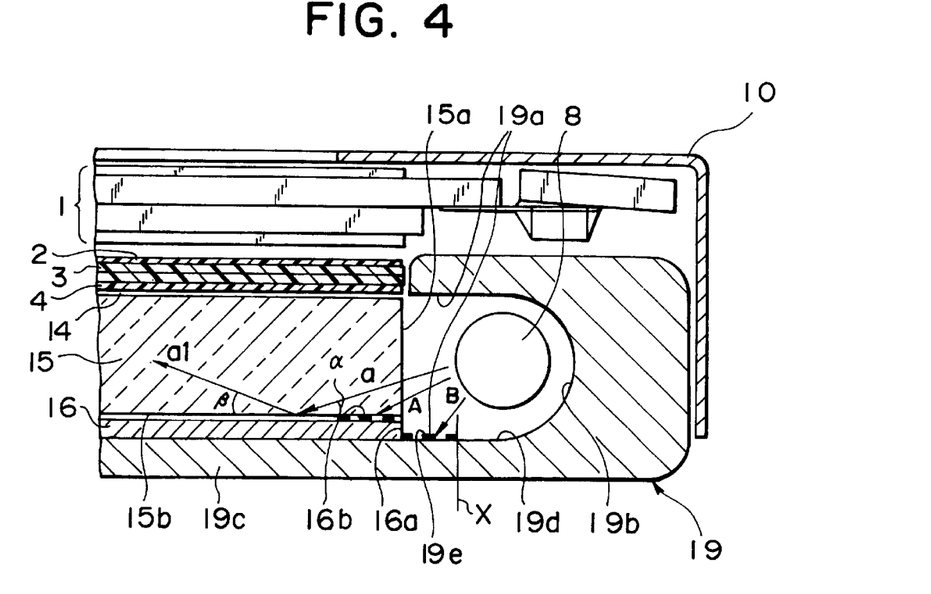
FIG. 4 is a sectional view of the main portion of a liquid crystal display device of a second embodiment according to the present invention.

Next, a liquid crystal display device of a second embodiment according to the present invention will be described. As shown in FIG. 4, the liquid crystal display device is arranged such that a light transmitting protection/diffusion sheet 2 is disposed on the back surface side of a liquid crystal panel 1 so as to diffuse light and protect the surface of lens sheets 3 disposed under the protection/diffusion sheet 2. The lens sheets 3 have a light transmitting property and are composed of two similar lens sheets laminated to each other with the upper surface thereof arranged as a prism surface for improving the brightness of light. A diffusion plate 14 disposed under the two lens sheets 3 is composed of a film such as PET (polyethylene terephthalate) or the like, one surface of the film being subjected to frosted-glass-like glaring prevention processing and having fine uneven portions formed thereto. The protection/diffusion sheet 2, the lens sheets 3 and the diffusion plate 14 are disposed by being laminated to each other with their surfaces in intimate contact with each other.

A light transmission member 15 which is made by molding an acrylic resin or the like having a high degree of transmittance to a sheet shape is disposed below the diffusion plate 14 to irregularly reflect the light entered to it from a side 15a thereof.

Successively laminated under the light transmission member 15 are a light transmission member reflection pattern 15b formed on the bottom surface of the light transmission member 15 and a reflection sheet 16 for reflecting the light irregularly reflected in the light transmission member 15 upward in an approximately vertical direction and causing the reflected right to emerge from the upper surface of the light transmission member 15 externally. The end surface 15a of the light transmission member 15 and the end surface 16a of the reflection sheet 16 are located on the same plane in a vertical direction and laminated, respectively.

Figure 6:
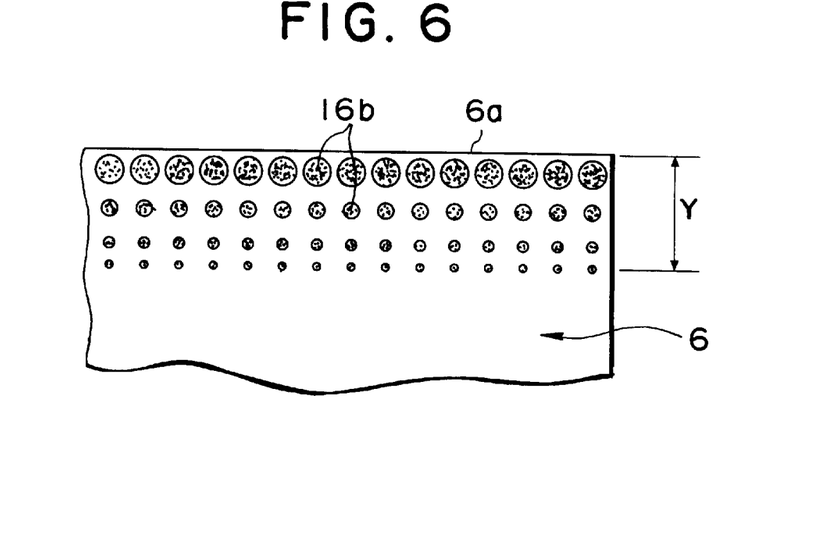
FIG. 6 is a schematic plan view describing a shape of a light quantity control portion of a reflecting sheet of the second embodiment.
Figure 7:
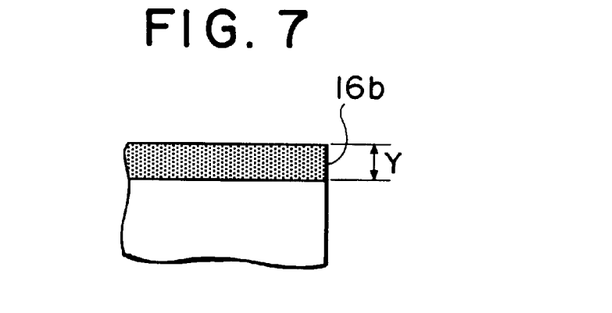
FIG. 7 is a schematic plan view describing another example of the shape of the light quantity control portion of the reflecting sheet of the second embodiment.
Figure 8:
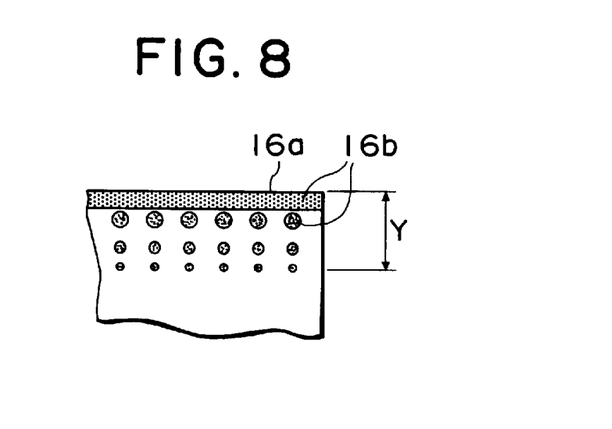
FIG. 8 is a schematic plan view describing still another example of the shape of the light quantity control portion of the reflecting sheet of the second embodiment.

As shown in FIG. 6 to FIG. 8, a light quantity control portion 16b is formed to the reflection sheet 16 within the range of 10 mm (size Y) from the end surface 16a thereof. The light quantity control portion 16b is made of a light absorbing color such as, for example, black, gray or the like formed to a dot pattern shape as shown in FIG. 6 by print or the like. The light quantity control portion 16b may be formed to an overall-printed pattern as shown in FIG. 7. Alternatively, the overall-printed pattern may be formed to the portion of the light quantity control portion 16b near to the end surface 16a thereof and the dot-pattern-shaped light quantity control portion 16b may be formed within the range within 10 mm (size Y) from the end surface 16a in proximity to the overall-printed pattern as shown in FIG. 8. With the above arrangement, the light irradiated from the backlight source 8 to the light quantity control portion 16b is absorbed by it and prevented from being reflected upward.

As shown in FIG. 4, a cylindrical backlight source 8 composed of a cold cathode fluorescent lamp (CCFL) or the like is disposed on the end surface 15a side of the light transmission member 15 and a reflector 19 which is made by molding a plastic material such as white polycarbonate or the like having a good light reflection efficiency is disposed around the backlight source 8 so as to encase it.

A U-shaped opening 19a is formed to the reflector 19 on the side thereof confronting the end surface 15a of the light transmission member 15 and the backlight source 8 is encased in the opening 19a.

A reflection surface 19b to which glossy processing is applied when it is molded is formed to the inner surface of the opening 19a to improve the reflection efficiency of the light irradiated from the backlight source 8.

The reflection surface 19b located on the lower side of the U-shaped opening 19a of the reflector 19 is extended to the other side to thereby form a case portion 19c on which the respective components such as the reflection sheet 16 and the like are placed integrally with the reflection surface 19b. The above glossy processing is not applied to the case portion 19c.

As shown in FIG. 4, a light quantity control portion 19e similar to the light quantity control portion 16b of the reflection sheet 16 is formed to an overall-printed state of black, gray or the like or/and to a dot state by print or the like on the lower flat portion 19d of the reflection surface 19b in connection to the end surface 16a of the reflection sheet 16 placed on the case portion 19c.

The light quantity control portion 19e of the reflection surface 19b is formed within the range from the end surface 16a of the reflection sheet 16 which is on the same plane as that of the end surface 15a of the light transmission member 15 to just below the backlight source 8. That is, it is formed in the range from the portion where a tangential line X which extends vertically downward from the outer periphery of the cold cathode fluorescent lamp or the like constituting the backlight source 8 is across the lower flat portion 19d to the outermost potion of the opening 19a.

The above respective components are held by being clamped by the reflector 19 having the case portion 19c and an upper holder 10 as a frame member.

The light emerged from the backlight source 8 includes a light beam traveling straight in a horizontal direction and oblique light beams obliquely entering the end surface 15a of the light transmission member 15 and the above horizontally traveling light beam enters the light transmission member 5 from the end surface 15a thereof and can travel to every point in the light transmission member 15 while irregularly reflecting therein.

The above incoming light beam in the irregularly reflecting state is reflected at the reflection sheet 16 under the light transmission member 15 upward in a vertical direction with respect to the surface direction of the light transmission member 15 and emerges from the upper surface of the light transmission member 15 upward. At the time, the light beam resulting from the irregularly reflected light beam in the light transmission member 5 which was reflected at the reflection sheet 16 also emerges externally upward from the upper surface of the portion of the light transmission member 15 on the side of the other end surface (not shown) thereof which confronts the end surface 15a of the light transmission member 15 in an approximately uniform degree of brightness.

The light emerged from the light transmission member 15 is diffused by the diffusion plate 14, the thus diffused light is collected to the visual field angle of an effective display area 1a by the lens sheets 3, passes through the protection/diffusion sheet 2 on the lens sheets 3 and uniformly irradiates the entire region of the effective display area 1a of the liquid crystal panel 1 from the backside thereof without unevenness as the conventional first light beam.

Although the oblique light beam A emerged from the backlight source 8 shown in FIG. 4 irradiates the light quantity control portion 16b and the oblique light beam B emerged therefrom irradiates the light quantity control portion 19e, respectively, since the oblique light beams A and B are absorbed by the light quantity control portions 16b and 19e, they are not reflected upward.

As a result, the emission lines 31c which are conventionally generated in the vicinity of the edge portion 1b of the effective display area 1a of the conventional liquid crystal panel 1 are not generated.

Since an oblique light beam a which reaches a position far from the light quantity control portion 16b of the reflection sheet 16 has a small incident angle α, the reflected light beam a1 thereof also has a small reflecting angle β likewise the incident angle α. Accordingly, the reflected light beam a1 is irregularly reflected in the light transmission member 15 and combined with the first light beam and can uniformly irradiate the entire region of the effective display area 1a of the liquid crystal panel 1 from the backside thereof without unevenness.

Figure 5:
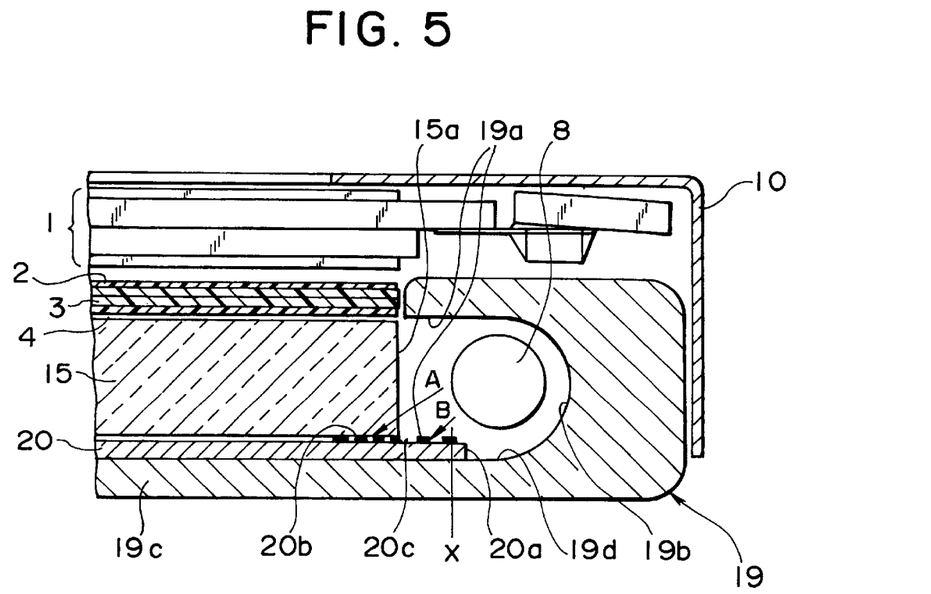
FIG. 5 is a sectional view of a main portion showing a modification of the second embodiment.

As a modification of the embodiment 2, when a reflection sheet 20 to which a light quantity control portion 20b is formed is extended from the end surface 15a of the light transmission member 15 to the outside thereof on the backlight source 8 side, a light quantity control portion 20c is also formed on the extended portion of the reflection sheet 20 and the extended portion of the reflection sheet 20 on which the light quantity control portion 20c is formed is laid on the lower flat portion 19d of the reflection surface 19b of the reflector 19 as shown in FIG. 5, since the oblique light beams A and B irradiated from the backlight source 8 are absorbed by the light quantity control portions 20b and 20c, the emission lines 31c described in the above conventional art are not generated. As a result, the entire region of the effective display area 1a of the liquid crystal panel 1 can be uniformly irradiated from the backside thereof without unevenness.

The reflection sheet 20 including the light quantity control portion 20c which extends externally from the end surface 15a of the light transmission member 15 is formed in the range from end surface 15a of the light transmission member 15 to just below the backlight source 8. That is, the reflection sheet 20 is extended from the portion where the tangential line X which extends vertically downward from the outer periphery of the cold cathode fluorescent lamp or the like constituting the backlight source 8 is across the lower flat portion 19d to the outermost potion of the opening 19a.

Note, the present invention is not limited to the arrangement that the backlight source 8 composed of the cold cathode fluorescent lamp or the like is disposed on the one end surface side of the light transmission member 5 but is also applicable to the arrangement that the backlight sources 8 are disposed on both the end surface sides of the light transmission member 5 in confrontation with each other.

Figure 9:
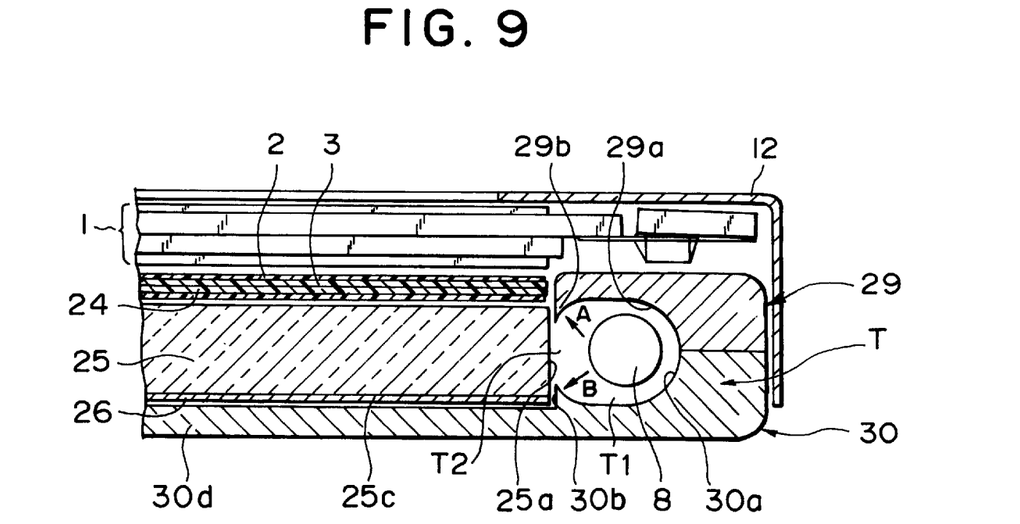
FIG. 9 is a sectional view of the main portion of a liquid crystal display device of a third embodiment according to the present invention.

Next, a third embodiment of a liquid crystal display device according to the present invention will be described. As shown in FIG. 9, the liquid crystal display device is arranged such that a light transmitting protection/diffusion sheet 2 is disposed on the back surface side of a liquid crystal panel 1 so as to diffuse light and protect the surface of lens sheets 3 disposed under the protection/ diffusion sheet 2. The lens sheets 3 have a light transmitting property and are composed of two similar lens sheets laminated to each other with the upper surface thereof arranged as a prism surface for improving the brightness of light. A diffusion plate 14 disposed under the two lens sheets 3 is composed of a film such as PET (polyethylene terephthalate) or the like, one surface of the film being subjected to frosted-glass-like glaring prevention processing and having fine uneven portions formed thereto. The protection/diffusion sheet 2, the lens sheets 3 and the diffusion plate 14 are disposed by being laminated to each other with their surfaces in intimate contact with each other.

Successively laminated under the diffusion plate 24 are a light transmission member 25 disposed below the diffusion plate 24 which is made by molding an acrylic resin or the like having a high degree of transmittance to a sheet shape for irregularly reflecting light entered to it from the end surface thereof, a light transmission member reflection pattern 25c disposed on the bottom surface of the light transmission member 25 and a reflection sheet 26 disposed under the light transmission member 25 for reflecting the light irregularly reflected in the light transmission member 25 upward in an approximately vertical direction and causing the reflected right to emerge externally upward from the light transmission member 25.

A reflector T made by molding a plastic material such as white polycarbonate or the like is disposed to the end surface 25a side of the light transmission member 25. The reflector T includes an encasing portion T1 which encases a backlight source 8 composed of a cold cathode fluorescent lamp (CCFL) or the like and disposed at the center thereof and an opening T2 which is formed to the side thereof in proximity to the end surface 25a of the light transmission member 25 and continuous to the encasing portion T1, the size of the opening T2 being made narrower than the vertical width of the encasing portion T1.

Since the reflector T is divided into two portions, that is, an upper reflector 29 and a lower reflector 30 and formed by molding or the like, the encasing portion T1 and the opening T2 can be easily processed.

The reflector T is formed as a single member by combining the divided upper and lower reflectors 29 and 30, reflection walls 29a and 30a are formed to a semi-circular shape around the inner periphery of the encasing portion T1 concentrically with the backlight source 8 and glossy processing is applied to the respective reflection walls 29a, 30a to improve the reflecting efficiency thereof.

Light direction control walls 29b, 30b are formed to the opening T2 of the reflector T to control the direction of the light from the backlight source 8. Since the light direction control walls 29b, 30b are formed by projecting the upper and lower ends of the opening T2 to control the direction of the light irradiated to the end surface 25a of the light transmission member 25 to prevent the oblique light beams A, B from the backlight source 8 from emerging directly outward, the generation of the emission lines 31c can be prevented because the aforesaid second light beam of the prior art does not reach the range within 10 mm from the edge portion 1b of the liquid crystal panel 1.

As shown in the enlarged view of the main portion of FIG. 11, curved reflection layers 29c, 30c composed of a reflection material having a high reflection efficiency which is different from the material of the reflection walls 29a, 30a are formed to the light direction control walls 29b, 30b on the encasing portion T1 side thereof.

The reflection material having the high reflection efficiency which forms the reflection layers 29c, 30c is mirror finished by being subjected to vapor deposition of a metal such as, for example, silver or the like or coated with a white paint or the like.

Since the size Y of the opening T2 where the light direction control walls 29b, 30b are formed is set to 50–95% of the thickness X of the light transmission member 5, the light from the backlight source 8 is not irradiated to the upper and lower corners 25b of the end surface 25a of the light transmission member 25. As a result, since the direct light from the backlight source 8 is irregularly reflected in the light transmission member 25 and reaches the other end surface (not shown) side of the light transmission member 25 which is apart from the end surface 25a thereof, the brightness at the other end surface is not almost changed even if it is apart from the backlight source 8 although the quantity of light at the portion near to the end surface 25a from the backlight source 8 is reduced.

As a result, since the brightness of the light beam emerged upward of the upper surface of the light transmission member 5 from the end surface 25a of the light conductor 35 is the same as the brightness of the light beam emerged upward of the upper surface of the light transmission member 25 from the other end surface (not shown) which is apart from the end surface 25a, the effective display area 1a of the liquid crystal panel 1 can be uniformly irradiated and the generation of the emission lines 31c can be prevented.

The above respective components are held by being clamped by the lower reflector 30 having the case portion 30d and an upper holder 12 as a frame member.

The light emerged from the backlight source 8 emerges from the opening T2 and enters the light transmission member 25 from the end surface 25a thereof. The incoming light can travel to every point in the light transmission member 25 while irregularly reflecting in the light transmission member 25. Further, the incoming light in the irregularly reflecting state is reflected upward in a vertical direction with respect to the surface direction of the light transmission member 25 at the light transmission member reflection pattern 25c on the bottom surface of the light transmission member 25 and the reflection sheet 26 under the light transmission member 25 and emerges upward from the upper surface of the light transmission member 25.

At the time, the light beam resulting from the irregularly reflected light beam in the light transmission member 25 which was reflected at the light transmission member reflection pattern 25c and the reflection sheet 26 also emerges externally upward from the upper surface of the portion of the light transmission member 25 on the side of the other end surface (not shown) thereof which confronts the end surface 15a of the light transmission member 25.

The light emerged from the light transmission member 25 is diffused by the diffusion plate 24, the thus diffused light is collected to the visual field angle of the effective display area 1a by the lens sheets 3, passes through the protection/diffusion sheet 2 on the lens sheets 3 and uniformly irradiates the entire region of the effective display area 1a of the liquid crystal panel 1 from the backside thereof without unevenness.

Since the light direction control walls 29b, 30b are disposed to the upper and lower sides of the opening T2 of the reflector T in the liquid crystal display device of the present invention described above, the oblique light beams A and B having a small inclining angle to the end surface 25a of the light transmission member 25 are shaded by the light direction control walls 29b, 30b and are not caused to directly emerge externally of the reflector T. As a result, the emission lines 31c which are conventionally generated within the range of 10 mm from the edge portion 1b can be prevented.

Since the oblique light beams A1 and B1 having a large inclining angle to the end surface 25a which emerge from the opening T2 and enter the light transmission member 25 are irregularly reflected at a position apart from the end surface 25a and emerge upward of the light transmission member 25, they are combined with the first light beam described in the prior art and can irradiate the entire surface of the effective display area 1a of the liquid crystal panel 1 with uniform brightness.

Since the size Y of the opening T2 is set to 50–95% of the thickness X of the light transmission member 25, the oblique light beams A and B from the backlight source 8 do not enter the upper and lower corners 25b of the end surface 25a of the light transmission member 25. As a result, since no "glaring state" emission lines 31c are generated to a position near to the edge portion 1b of the liquid crystal panel 1, the irradiation at the portion of the effective display area 1a within 10 mm from the edge portion 1b of the liquid crystal panel 1 is as bright as that of the portion of the effective display area 1a apart 10 mm or more from the edge portion 1b, whereby the effective display area 1a having uniform brightness can be obtained.

Figure 10:
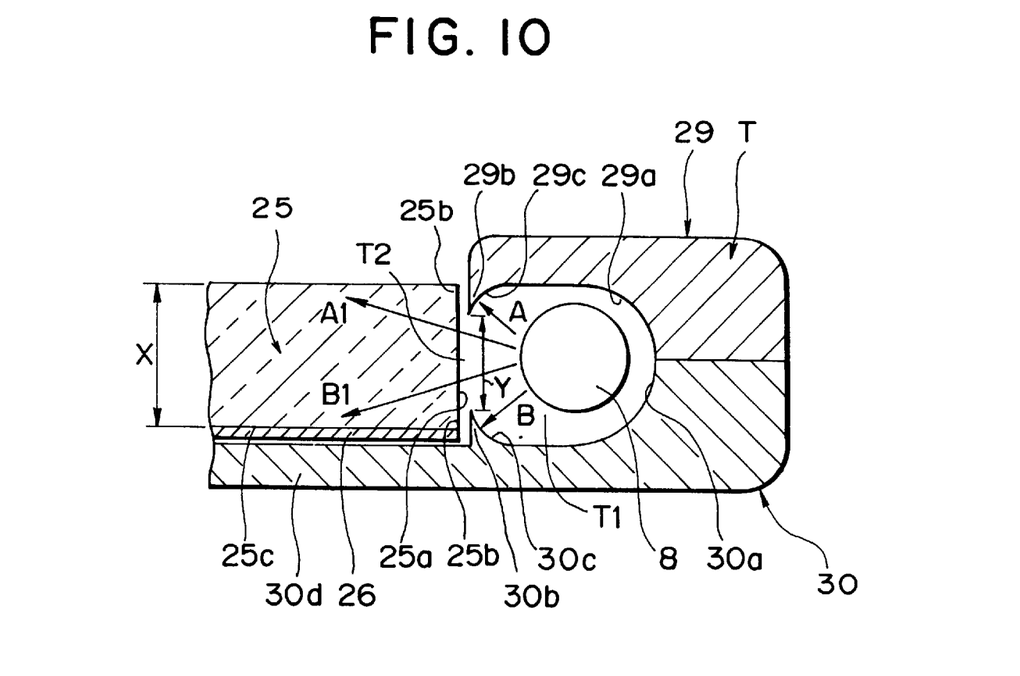
FIG. 10 is an enlarged sectional view of the main portion of the liquid crystal display device of the third embodiment.

Even if the quantity of light from the backlight source 8 is reduced by the light direction control walls 29b, 30b of the reflector T, since the mirror-finished reflection layers 29c, 30c are formed to the curved insides of the light direction control walls 29b, 30b, the oblique light beams A and B shaded by the light direction control walls 29b, 30b are reflected at the reflection layers 29c, 30c toward the encasing portion T1.

Since the reflected light beams impinge on the reflection walls 29a, 30a and are reflected thereat in the direction of the opening T2, the quantity of light emerged externally from the opening T2 is composed of the quantity of the oblique light beams A and B from the reflection layers 29c, 30c of the light direction control walls 29b, 30b in addition to the quantity of the conventional direct light from the backlight source 8 and the quantity of the conventional reflected light from the reflection layers 29c, 30c. Thus, even if the brightness of the backlight source 8 is the same as the conventional brightness, the light beam emerged externally from the opening T2 can be made more bright than the conventional light beam.

Accordingly, the entire region of the effective display area 1a of the liquid crystal panel 1 can be brightly and uniformly irradiated from the backside thereof by the light of high brightness without unevenness.

Note, the present invention is not limited to the arrangement that the backlight source 8 composed of the cold cathode fluorescent lamp or the like is disposed on the one end surface side of the light transmission member 5 but is also applicable to the arrangement that the backlight sources 8 are disposed on both the end surface sides of the light transmission member 5 in confrontation with each other.

As described above, since the liquid crystal display device of the present invention forms the light quantity control portion to the dot shape on at least one side of the diffusion plate which is located near to the backlight, the light from the backlight source is not absorbed by a portion of the reflection sheet. As a result, since all the light from the backlight source emerges from the light transmission member, the light of high brightness which is about 20% brighter than conventional light can be caused to pass through the diffusion plate to which the light quantity control portion is formed to the dot shape, whereby the entire surface of the effective display area 1a of the liquid crystal panel 1 can be uniformly and brightly irradiated from the backside thereof without emission lines and unevenness.

Since the size of the dots of the dot pattern of the light quantity control portion is increased toward the backlight source and gradually reduced as the light quantity control portion is apart from the backlight source, the light of high brightness which has the largest quantity of light and is located near to the backlight source is reduced by the pattern having the large dots and the size of the dot pattern is gradually reduced in proportion to that the quantity of light is gradually reduced up to the position about 10 mm apart from the edge portion 1b of the effective display area 1a, the light emerged from the diffusion plate provided with the light quantity control portion can achieve the uniform and bright irradiation without unevenness.

Since the diffusion plate has the one surface to which no glaring prevention processing is applied and the other surface to which the glaring prevention processing is applied and the light quantity control portion is formed to the one surface which is not subjected to the glaring prevention processing, the dot pattern as the light quantity control portion is formed by print or the like on the smooth surface which is not subjected to the glaring prevention processing. As a result, the dot pattern is strongly secured to the smooth surface and not exfoliated therefrom while the diffusion plate is handled.

Since the liquid crystal display device of the present invention forms the light quantity control portion to the reflection sheet on the side thereof near to the backlight source and the light quantity control portion to the reflection surface of the reflector on the side thereof which is in contact with the reflection sheet in the fashion that the former light quantity control portion is continuous to the latter light quantity control portion and the light quantity control portion formed to the reflection surface of the reflector covers the range from the end surface of the light transmission member to just below the backlight source, the oblique light beams from the backlight source are absorbed by the light quantity control portions, whereby the effective display area can be uniformly irradiated without emission lines and unevenness.

The reflection sheet is extended from the end surface of the light transmission member to the outside thereof on the side of the backlight source and the light quantity control portion is formed to the portion of the reflection sheet which is near to the end surface of the light transmission member and to the extended portion of the reflection surface and the extended portion of the reflection sheet to which the light quantity control portion is formed is laid on the reflection surface of the reflector so that the light quantity control portion disposed on the reflection surface of the reflector covers the range from the end surface of the light transmission member to just below the backlight source. As a result, since the generation of the emission lines in the effective display area can be prevented by the formation of the light quantity control portion only to the reflection sheet side without forming it to the reflector side, it is simple to print the light quantity control portion to the overall-printed state or the dot pattern state, whereby the liquid crystal display device without the emission lines can be provided at a low cost.

Since the light quantity control portion is formed to the overall-printed state or the dot pattern state, the size of the dots and the density of the overall print can be changed in correspondence to the brightness of the edge portion 1b of the effective display area 1a of the liquid crystal panel 1 by changing a print screen for printing the light quantity control portion, whereby the liquid crystal display device having optimum brightness without emission lines can be provided in correspondence to various types of products.

Since the liquid crystal display device of the present invention forms the light direction control walls to the opening of the reflector to control the direction of the light from the backlight source and the light direction control walls project from the upper and lower portions of the opening, the oblique light beams from the backlight source can be shaded by the light direction control walls of the single structure, whereby the entire surface of the effective display area of 1a the liquid crystal panel 1 can be uniformly irradiated from the backside thereof without emission lines and unevenness.

Since the size of the opening of the light direction control walls is set to 50–95% of the thickness of the light transmission member, the uniform irradiation without emission lines and unevenness can be secured to the portion of the effective display area 1a of the liquid crystal panel near to the edge portion 1b. As a result, when parts whose opening size is changed in accordance with various types of products, there can be provided the liquid crystal display device in which the brightness of irradiation of the liquid crystal panel is not dispersed even if a type of a product is changed.

Further, since the reflection layers composed of the material different from that of the reflection walls are formed to the insides of the light direction control walls, the oblique light beams emerged from the backlight source are reflected at the reflection layers toward the encasing portion, reflected at the periphery of the encasing portion and emerge from the opening to the light transmission member together with the direct light from the backlight source, the entire surface of the effective display area 1a of the liquid crystal panel 1 can be brightly and uniformly irradiated from the backside thereof without emission lines and unevenness.

What is claimed is:

1. A liquid crystal display device, comprising:
    a liquid crystal panel;
    a light transmission member disposed below said liquid crystal panel;
    a reflection sheet disposed below said light transmission member;
    a light source disposed adjacent to an end of said light transmission member; and
    a reflector having a reflection surface reflecting the light from said light source to an end of said light transmission member, the reflection surface of said reflector being disposed around said light source such that said light source is at least partially encased by the reflection surface;
    wherein a first light quantity control portion is formed on the surface of said reflection sheet closest to said light source and a second light quantity control portion is continuously formed on the reflection surface of said reflector on the side thereof which is in contact with said reflection sheet from the end of said light transmission member to just below said light source, and said first and second light quantity control portions include dot patterns to absorb light from said light source incident thereon in an oblique direction.

2. A liquid crystal display device, comprising:
    a liquid crystal panel;
    a light transmission member disposed below said liquid crystal panel;
    a reflection sheet disposed below said light transmission member and having a light quantity control portion;
    a light source disposed adjacent to an end of said light transmission member; and
    a reflector having a reflection surface reflecting the light from said light source to the end of said light transmission member, the reflection surface of said reflector being disposed around said light source such that said light source is at least partially encased by the reflection surface,
    wherein said reflection sheet is extended from the end of said light transmission member to just below said light source and said light quantity control portion is formed on said extended part of said reflection sheet from just below said light source to said reflection sheet near said extended part and under said light transmission member, and said light quantity control portion includes dot patterns to absorb light from said light source incident thereon in an oblique direction.

3. A liquid crystal display device according to claim 1, wherein a dot size of dots comprising the dot pattern decreases from dots nearest to said light source to dots farthest away from said light source.

4. A liquid crystal display device according to claim 1, wherein the dot patterns in said first and second light quantity control portions are printed with a light absorbing color ink.

5. A liquid crystal display device, comprising:
    a liquid crystal panel;
    a light transmission member disposed below said liquid crystal panel;
    a reflection sheet disposed below said light transmission member;
    a light source disposed adjacent to an end of said light transmission member; and
    a reflector having a reflection surface reflecting light from said light source to the end of said light transmission member, the reflection surface of said reflector being disposed around said light source such that said light source is at least partially encased by the reflection surface;

wherein a first light quantity control portion is formed on the surface of said reflection sheet closest to said light source and a second light quantity control portion is continuously formed on the reflection surface of said reflector on the side thereof which is in contact with said reflection sheet from the end of said light transmission member to just below said light source, and said first and second light quantity control portions are formed of strip-shaped overall-printed patterns and absorb light from said light source incident thereon in an oblique direction.

6. A liquid crystal display device according to claim 5, wherein the overall-printed patterns in said first and second light quantity control portions are formed of a light absorbing color ink.

7. A liquid crystal display device, comprising:

a liquid crystal panel;

a light transmission member disposed below said liquid crystal panel;

a reflection sheet disposed below said light transmission member;

a light source disposed adjacent to an end of said light transmission member; and a reflector having a reflection surface reflecting light from said light source to the end of said light transmission member, the reflection surface of said reflector being disposed around said light source such that said light source is at least partially encased by the reflection surface;

wherein a first light quantity control portion is formed on the surface of said reflection sheet closest to said light source and a second light quantity control portion is continuously formed on the reflection surface of said reflector on the side thereof which is in contact with said reflection sheet from the end of said light transmission member to just below said light source, each of said first and second light quantity control portions is composed of a strip-shaped overall-printed pattern formed near said light source and a dot pattern is continuously formed with the overall-printed pattern, and tho overall-printed pattern and the dot pattern absorb light from said light source incident thereon in an oblique direction.

8. A liquid crystal display device according to claim 7, wherein the overall-printed patterns and the dot patterns in said first and second light quantity control portions are formed of a light absorbing color ink.

9. A liquid crystal display device according to claim 7, wherein a dot size of dots comprising the dot pattern decreases from dots nearest to said light source to dots farthest away from said light source.

10. A liquid crystal display device according to claim 2, wherein the dot pattern in said light quantity control portion is formed of a light absorbing color ink through printing.

11. A liquid crystal display device according to claim 2, wherein a dot size of dots comprising the dot pattern decreases from dots nearest to said light source to dots farthest away from said light source.

12. A liquid crystal display device, comprising:

a liquid crystal panel;

a light transmission member disposed below said liquid crystal panel;

a reflection sheet disposed below said light transmission member and having a light quantity control portion;

a light source disposed adjacent to an end of said light transmission member; and a reflector having a reflection surface reflecting light from said light source to the end of said light transmission member, the reflection surface of said reflector being disposed around said light source such that said light source is at least partially encased by the reflection surface;

wherein said reflection sheet is extended from the end of said light transmission member to just below said light source, said light quantity control portion is formed from just below said light source on said extended part of said reflection sheet to said reflection sheet near said extended part and under said light transmission member, and said light quantity control portion is formed of a strip-shaped overall-printed pattern to absorb light from said light source incident thereon in an oblique direction.

13. A liquid crystal display device according to claim 12, wherein the overall-printed pattern in said light quantity control portion is formed of a light absorbing color ink.

14. A liquid crystal display device, comprising:

a liquid crystal panel;

a light transmission member disposed below said liquid crystal panel;

a reflection sheet disposed below said light transmission member and having a light quantity control portion;

a light source disposed adjacent to an end of said light transmission member; and a reflector having a reflection surface reflecting light from said light source to the end of said light transmission member, the reflection surface of said reflector being disposed around said light source such that said light source is at least partially encased by the reflection surface;

wherein said reflection sheet is extended from the end of said light transmission member to just below said light source, said light quantity control portion is formed from just below said light source on said extended part of said reflection sheet to said reflection sheet near said extended part and under said light transmission member, said light quantity control portion is composed of a strip-shaped overall-printed pattern formed near said light source and a dot pattern formed continuously with the overall-printed pattern, and the overall-printed pattern and the dot pattern absorb light from said light source incident thereon in an oblique direction.

15. A liquid crystal display device according to claim 14, wherein the overall-printed pattern and the dot pattern in said light quantity control portion are formed of a light absorbing color ink.

16. A liquid crystal display device according to claim 14, wherein a dot size of dots comprising the dot pattern decreases from dots nearest to said light source to dots farthest away from said light source.

* * * * *

UNITED STATES PATENT AND TRADEMARK OFFICE
CERTIFICATE OF CORRECTION

PATENT NO.     : 6,313,891 B1
DATED          : November 6, 2001
INVENTOR(S)    : Hideaki Nagakubo et al.

It is certified that error appears in the above-identified patent and that said Letters Patent is hereby corrected as shown below:

<u>Title page,</u>
ABSTRACT,
Line 2, " delete portion b $4a$" and substitute -- portion $4a$ -- in its place.

<u>Column 17,</u>
Line 42, delete "tho overall-printed" and substitute -- the overall-printed -- in its place.

Signed and Sealed this

Ninth Day of July, 2002

Attest:

JAMES E. ROGAN
*Attesting Officer*  *Director of the United States Patent and Trademark Office*